No. 684,300. Patented Oct. 8, 1901.
D. H. O'MEARA.
VEHICLE WHEEL.
(Application filed Mar. 22, 1901.)
(No Model.) 2 Sheets—Sheet 1.
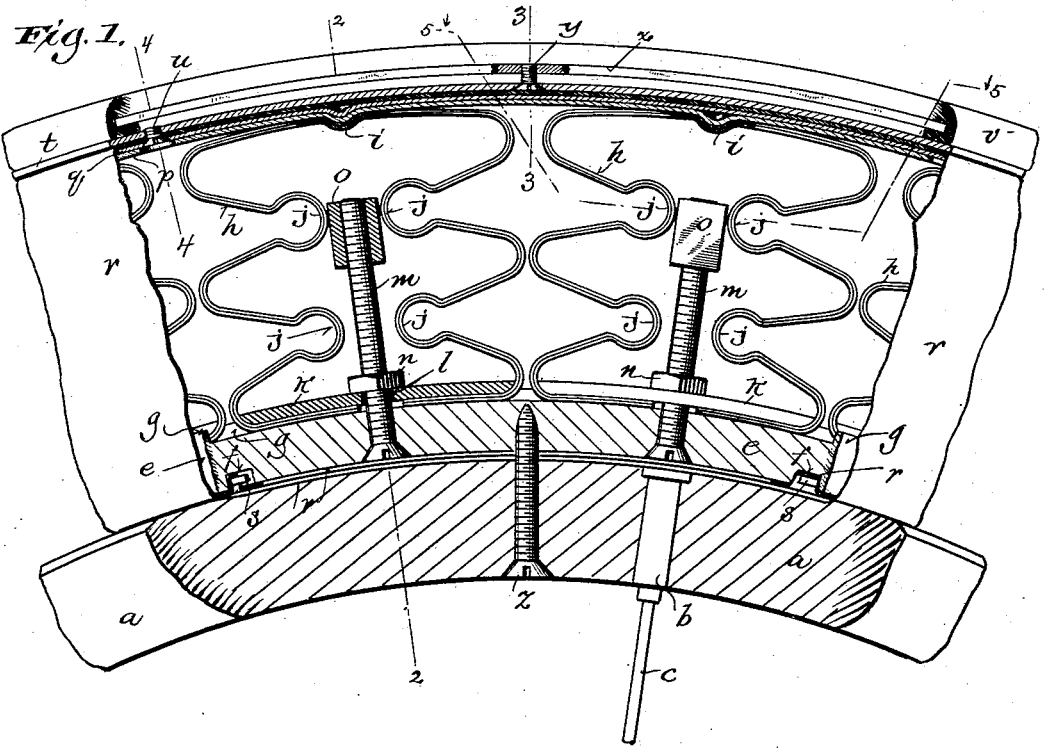
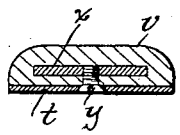
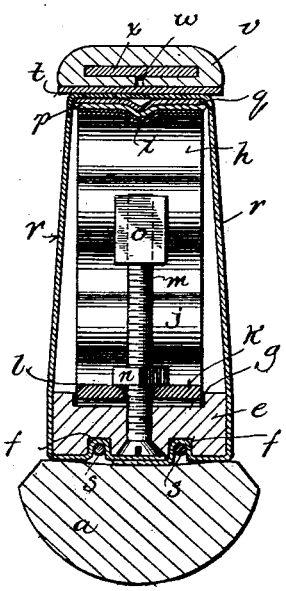
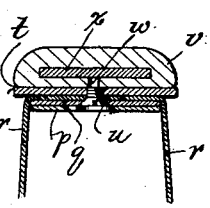
Witnesses
Geo. W. Young.
B. C. Roloff.
Inventor
Denis H. O'Meara
By H. G. Underwood
Attorney No. 684,300. Patented Oct. 8, 1901.
D. H. O'MEARA.
VEHICLE WHEEL.
(Application filed Mar. 22, 1901.)
(No Model.) 2 Sheets—Sheet 2.

UNITED STATES PATENT OFFICE.

DENIS H. O'MEARA, OF WORCESTER, MASSACHUSETTS.

VEHICLE-WHEEL.

SPECIFICATION forming part of Letters Patent No. 684,300, dated October 8, 1901.

Application filed March 22, 1901. Serial No. 52,313. (No model.)

*To all whom it may concern:*

Be it known that I, DENIS H. O'MEARA, a citizen of the United States, and a resident of Worcester, in the county of Worcester and State of Massachusetts, have invented certain new and useful Improvements in Vehicle-Wheels; and I do hereby declare that the following is a full, clear, and exact description thereof.

My invention relates to vehicle-wheels; and it consists in certain peculiarities of construction and combination of parts, as will be fully set forth hereinafter with reference to the accompanying drawings and subsequently claimed.

Figure 6:
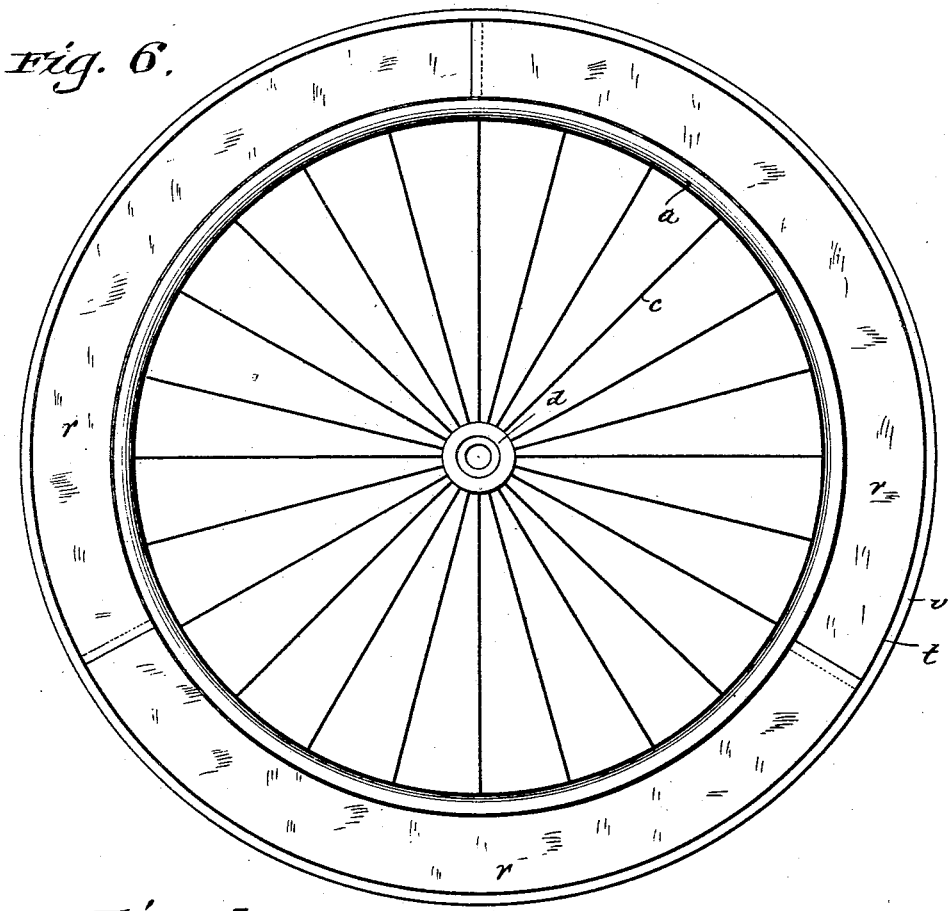
Figure 5:
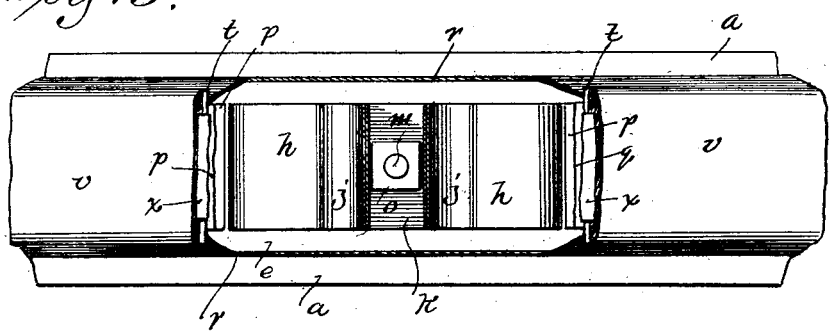

In the said drawings, Figure 1 is a representation, partly in elevation and partly in section, of the rim and tire of a wheel embodying my present invention. Figs. 2, 3, and 4 are transverse sectional views taken on the lines 2 2, 3 3, and 4 4, respectively, of Fig. 1. Fig. 5 is a detail plan view, partly in section, on the line 5 5 of Fig. 1. Fig. 6 is a side elevation of one of my complete wheels.

My invention is especially designed to take the place of wheels having pneumatic tires, such as are commonly employed in connection with bicycles, tricycles, automobiles, and other vehicles, and obviates the objectionable liability of such tires to being punctured or otherwise rendered unfit for use, while at the same time affording the desired resiliency and lightness.

Referring to the drawings, $a$ represents the annular rim, preferably of wood, which is perforated at intervals to receive the nipples $b$ for the spokes $c$, which extend and are secured in the usual manner to the hub $d$. The outer periphery of the rim $a$ is preferably very slightly concaved. Another annular rim $e$, also preferably of wood and of greater diameter than the rim $a$, so as to slip over it, as afterward described, is of generally oblong shape in cross-section, but provided with two parallel annular grooves $f\,f$ in the inner side and with a wide annular channel $g$ on its opposite or outer surface, the latter being for the reception of the springs $h\,h$, which are composed of properly-bent strips of flat steel of a width to just fit snugly within the said channel $g$. The shape of these springs is best shown in Fig. 1, and preferably, as therein shown, each spring is formed of two thin strips of the described flat steel instead of a single thicker strip, although in some instances the latter may be employed, the shape of the springs being the same in either case, comprising convex outer portions centrally provided with inward indentations $i$ and formed with a series of inner rounded loops $j\,j$, connected by inclined outer side portions, the two ends of the strips of which the springs are formed approaching each other without touching at the center, so as to there leave a space between them, and resting within the described groove $g$ in the supplementary rim $e$, said spring ends conforming to the shape of the said rim, and are confined in place by washers $k$, having central smooth-bored holes $l$ therethrough and screws $m$ and nuts $n$. These screws $m$ are passed through the supplemental rim $e$ and the holes $l$ in the washers $k$ and at their ends are fitted with nuts $o$, having, preferably, square outer sides which fit snugly between the outer pairs of rounded loops $j\,j$ of the springs $h$ when the parts are assembled, as shown in Fig. 1, and thereby these screws $m$ are kept from turning, and the tightening of the springs to place is accomplished by turning the nuts $n$ against the washers $k$.

Encircling the annular series of springs $h$ $h$ is a metal band $p$, preferably of highly-tempered steel, surrounded by another metal band $q$ of similar material, these bands being continuous hoops, the ends of the metal strips of which they are formed being either electrically welded or riveted together, as preferred. The band $p$ is held to the springs by means of inward indentations in said band fitting into the indentations $i$ in the outer convex portions of the springs, and the band $q$ is held to the band $p$ by like indentations fitting into those in the first-named band, and all this part of the tire, comprising the supplementary rim $e$, the annular series of springs $h$, held to the said rim, as described, and the two metal bands $p$ and $q$, is enveloped in strips of suitable fabric $r$, preferably what is known as "waterproof fabric" or "enameled cloth," whose edges are overlapped on the inner surface of the rim $e$ and held in place by spring-wire rings $s$, which force the fabric into the described grooves $f$ in said rim, all as best shown in Fig. 2.

Encircling the fabric-protected outer band $q$ is another flat continuous metal band $t$, preferably of aluminium and of greater width than the other bands, and all three of these bands being united at intervals by screws $u$, whose shanks pass through holes in the bands $p\ q$ and fabric $r$ and engage with screw-threaded bores tapped in the band $t$, the holes in the band $q$ being countersunk to fit the heads of these screws, all as best shown in Fig. 4. Encircling this band $t$ is the rubber tread $v$, molded in one continuous piece, of the shape in cross-section best shown in Figs. 2 and 4, with an annular central space and communicating central annular slit $w$, whereby a metal band $x$ (preferably of aluminium and welded or riveted to form a continuous hoop) is inserted through the slit $w$ into said space, the said band $x$ being united to the said band $t$ at intervals by means of screws $y$, whose heads fit within countersunk openings in the band $t$ and whose shanks engage with screw-threaded bores in the band $x$, as best shown in Fig. 3, the portion of the rubber tread $v$ which lies between the bands $t$ and $x$ being firmly clamped by means of the tightening of the screws $y$.

The described fabric-protected supplementary spring-rim and its described tread are united to the rim $a$ by series of screws $z$, passed at intervals through the said rim $a$ and the folds of the fabric $r$ into the supplementary rim $e$, and when it is desired to remove the tread $v$ and its supporting-band $t$ from the spring-rim and its fabric-incased parts (after the latter has been released from the rim $a$ by the withdrawal of the screws $z$) it is a simple matter to remove the wire rings $s$ (whose ends need not be united) from the grooves $f$, spread apart the fabric covering $r$, and withdraw the screws $u$, when the tread part can be readily pushed off, the assembling of all these parts being accomplished by the reverse of these operations. Any desired number of strips of fabric $r$ may be employed; but I find three a convenient number, as shown in Fig. 6.

My wheels will be found to possess great lightness and flexibility, combined with firmness and strength, and at the same time the described screws $m$, which unite the springs $h$ to the supplementary rim $e$, serve, in connection with their outer nuts $o$, as stop-arms to guard against undue compression of the spring-rim, (said nuts $o$ serving, to regulate the length of said stop-arms, and thus render same adjustable in this respect, as may be necessary according to the strength and resistance of the springs in any given instance,) thus protecting the springs from injury and increasing their longevity, while from the described construction of the entire device should any parts become broken or injured or wear out the same can be readily removed and replaced with new like parts without disturbing or rendering worthless the other portions of the wheel.

Having thus described my invention, what I claim as new, and desire to secure by Letters Patent, is—

1. In a vehicle-wheel, the combination with an inner rim to which the spokes are secured, of a supplementary rim and encircling metal band, united by an interposed series of flat bent metallic springs, forming a spring-rim removably secured to said inner rim, and an outer molded rubber tread having a metal band embedded therein, and entirely inclosed thereby, and said tread being removably secured to said spring-rim.

2. In a vehicle-wheel, the combination with a rim and encircling metal band, of an interposed series of flat bent metallic springs and a series of screws, which unite said springs to said rim, and serve as stop-arms to prevent undue compression.

3. In a vehicle-wheel, the combination with a rim and encircling metal band, of an interposed series of flat bent metallic springs, a series of screws uniting the springs to the rim, and serving as stop-arms to prevent undue compression, and nuts upon the ends of said screws, for varying the length of said stop-arms.

4. In a vehicle-wheel, the combination with a rim and encircling metal band, of an interposed series of springs formed of flat metallic strips, bent inwardly and outwardly and with their ends bent toward each other and resting on the outer surface of said rim; a series of washers resting on said spring ends; a series of screws passing through said rim and washers; intermediate nuts on said screws for clamping the washers, spring ends and rim together; and other nuts on the outer ends of said screws in contact with the adjacent inwardly-bent portions of said springs.

5. In a vehicle-wheel, the combination with an inner rim to which the spokes are secured, of a supplementary rim and encircling metal band, an interposed series of flat bent metallic springs; and a series of screws, which unite said springs to said supplementary rim, forming a spring-rim removably secured to said inner rim, and said screws serving as stop-arms to prevent undue compression of said spring-rim.

6. In a vehicle-wheel, the combination with a rim and encircling metal band, of an interposed series of springs, each formed of two flat metallic strips, placed one against the other and bent together so as to have convex centrally-indented outer surfaces and a series of inward projections terminating in rounded loops, and with their ends bent toward each other to conform to the shape of the outer surface of said rim, and with the encircling metal band similarly indented so as to engage the indentations in the springs; a series of washers resting on said spring ends; a series of screws passing through said rim and washers, and between the opposed ends of said spring ends; intermediate nuts on said screws for clamping the washers, spring ends and rim together; and square-faced nuts adjustably secured to the outer ends of said screws, and interposed between the outer pair of inwardly-projecting loops on the springs and in contact therewith.

7. In a vehicle-wheel, the combination of an inner rim to which the spokes are secured, of a supplementary rim and encircling metal band, and an interposed annular series of flat bent metallic springs, held to said rim by a series of screws, and forming a spring-rim removably secured to said inner rim; an outer molded rubber tread having a metal band embedded therein and entirely inclosed thereby, and a flat supporting metal band secured to said molded tread, the latter being removably secured to said spring-rim; and strips of waterproof fabric entirely surrounding said spring-rim, and interposed between it and said inner rim, and between said spring-rim and the supporting metal band of said tread.

In testimony that I claim the foregoing I have hereunto set my hand, at Worcester, in the county of Worcester and State of Massachusetts, in the presence of two witnesses.

DENIS H. O'MEARA.

Witnesses:
   HENRY F. HARRIS,
   J. OTIS SIBLEY.